US012803084B2

(12) United States Patent
Kim et al.

(10) Patent No.: US 12,803,084 B2
(45) Date of Patent: Nov. 17, 2026

(54) HEAT-SHIELDING SHEET FOR BATTERY

(71) Applicant: NANOTIM CO., LTD., Daejeon (KR)

(72) Inventors: Tae Hun Kim, Seoul (KR); Il Hyuck Yoo, Sejong-si (KR); Sang Beom Jin, Daejeon (KR); Yun Seung Choi, Seongnam-si (KR)

(73) Assignee: NANOTIM CO., LTD., Daejeon (KR)

( * ) Notice: Subject to any disclaimer, the term of this patent is extended or adjusted under 35 U.S.C. 154(b) by 190 days.

(21) Appl. No.: 18/395,768

(22) Filed: Dec. 26, 2023

(65) Prior Publication Data

US 2024/0405326 A1 Dec. 5, 2024

(30) Foreign Application Priority Data

Jun. 1, 2023 (KR) ........................ 10-2023-0070795

(51) Int. Cl.
*H01M 10/658* (2014.01)
*B32B 5/02* (2006.01)
(Continued)

(52) U.S. Cl.
CPC ............. *H01M 10/658* (2015.04); *B32B 5/02* (2013.01); *B32B 5/16* (2013.01); *B32B 5/18* (2013.01);
(Continued)

(58) Field of Classification Search
CPC ..... H01M 10/658; H01M 50/383; B32B 5/02; B32B 5/16; B32B 5/18; B32B 5/30; B32B 9/007; B32B 9/046; B32B 9/048; B32B 2250/05; B32B 2260/023; B32B 2260/025; B32B 2260/046; B32B 2262/101; B32B 2264/1023; B32B 2264/108; B32B 2266/0214; B32B 2307/3065; B32B 2307/7376; B32B 2457/10; B32B 2264/102; B32B 2264/1026;
(Continued)

(56) References Cited

U.S. PATENT DOCUMENTS 3,159,601 A 12/1964 Ashby
3,220,972 A 11/1965 Lamoreaux
(Continued)

FOREIGN PATENT DOCUMENTS

JP 61-275117 A 12/1986
JP 11-21117 A 1/1999
(Continued)

OTHER PUBLICATIONS

The extended European search report of European Patent Application No. 23220651.6 mailed Jun. 12, 2024.
(Continued)

*Primary Examiner* — Nathan L Van Sell
(74) *Attorney, Agent, or Firm* — Revolution IP, PLLC

(57) ABSTRACT

Proposed is a heat-shielding sheet for a battery, the sheet sequentially including an inner layer made of a polymer resin, a silicone foam layer, a graphite layer, and a glass bubble layer. Thus, there are advantages of solving the disadvantage of polyurethane foam, used in existing heat-shielding sheets for batteries, that in the event of a fire, the fire spreads and thermal runaway is accelerated, being lighter than metallic materials, and being capable of rapidly preventing flames and heat from spreading.

7 Claims, 11 Drawing Sheets

(51) Int. Cl.

| | |
|---|---|
| ***B32B 5/16*** | (2006.01) |
| ***B32B 5/18*** | (2006.01) |
| ***B32B 5/30*** | (2006.01) |
| ***B32B 9/00*** | (2006.01) |
| ***B32B 9/04*** | (2006.01) |
| ***H01M 50/383*** | (2021.01) |

(52) U.S. Cl.
CPC ................ *B32B 5/30* (2013.01); *B32B 9/007* (2013.01); *B32B 9/046* (2013.01); *B32B 9/048* (2013.01); *H01M 50/383* (2021.01); *B32B 2250/05* (2013.01); *B32B 2260/023* (2013.01); *B32B 2260/025* (2013.01); *B32B 2260/046* (2013.01); *B32B 2262/101* (2013.01); *B32B 2264/1023* (2020.08); *B32B 2264/108* (2013.01); *B32B 2266/0214* (2013.01); *B32B 2307/3065* (2013.01); *B32B 2307/7376* (2023.05); *B32B 2457/10* (2013.01)

(58) Field of Classification Search
CPC ...... B32B 2266/0207; B32B 2307/304; B32B 2307/306; B32B 2383/00; B32B 27/065; B32B 27/283; B32B 27/36; B32B 7/12; B32B 9/045; B32B 27/18; B32B 27/20; B32B 33/00; B32B 2255/26; B32B 2262/0269; B32B 2262/10; B32B 2262/105; B32B 2262/106; B32B 2307/558; B32B 2605/08; Y02E 60/10
See application file for complete search history.

(56) References Cited

U.S. PATENT DOCUMENTS

| | | | | |
|---|---|---|---|---|
| 3,296,291 | A | 1/1967 | Chalk et al. | |
| 3,419,593 | A | 12/1968 | Willing | |
| 3,516,946 | A | 6/1970 | Modic | |
| 3,715,334 | A | 2/1973 | Karstedt | |
| 3,814,730 | A | 6/1974 | Karstedt | |
| 3,923,705 | A | 12/1975 | Smith | |
| 3,928,629 | A | 12/1975 | Chandra et al. | |
| 3,989,668 | A | 11/1976 | Lee et al. | |
| 5,036,117 | A | 7/1991 | Chung et al. | |
| 5,175,325 | A | 12/1992 | Brown et al. | |
| 6,605,734 | B2 | 8/2003 | Roy et al. | |
| 2022/0181715 | A1 | 6/2022 | Jiang et al. | |
| 2022/0388291 | A1 | 12/2022 | Wang et al. | |
| 2023/0253673 | A1 * | 8/2023 | Taylor ..................... | B32B 19/00 429/156 |

FOREIGN PATENT DOCUMENTS

| | | | |
|---|---|---|---|
| JP | 2022-106327 | A | 7/2022 |
| KR | 10-2018-0031968 | A | 3/2018 |
| KR | 10-2020-0063059 | A | 6/2020 |
| KR | 10-2021-0046899 | A | 4/2021 |
| KR | 10-2022-0053251 | A | 4/2022 |
| KR | 10-2022-0090776 | A | 6/2022 |
| KR | 10-2425374 | B1 | 7/2022 |
| KR | 10-2022-0160302 | A | 12/2022 |
| KR | 10-2022-0165946 | A | 12/2022 |
| KR | 10-2023-0028764 | A | 3/2023 |
| WO | 2021-262634 | A1 | 12/2021 |
| WO | 2022-155056 | A1 | 7/2022 |

OTHER PUBLICATIONS

International Search Report of PCT/KR2023/021917 mailed Apr. 3, 2024.

* cited by examiner

HEAT-SHIELDING SHEET FOR BATTERY

CROSS REFERENCE TO RELATED APPLICATION

The present application claims priority to Korean Patent Application No. 10-2023-0070765, filed Jun. 1, 2023, the entire contents of which is incorporated herein for all purposes by this reference.

BACKGROUND OF THE DISCLOSURE

1. Field of the Disclosure

The present disclosure relates to a heat-shielding sheet for a battery. Specifically, the present disclosure relates to sheet for a battery, the sheet being a heat-shielding characterized by including a functional layer sheet, composed of a flame-retardant layer, a graphite layer, a barrier layer, and the like, in silicone foam used in existing heat-shielding sheets for batteries to solve the disadvantage of polyurethane foam that in the event of a fire, the fire spreads and thermal runaway is accelerated.

2. Description of the Related Art

Various electronic devices used in the automotive, electrical, and electronic fields are preferred to be multifunctional and flexible while being lightweight, thin, and miniaturized. However, in electronic devices that make up electronic equipment, heat that may affect the operation of the corresponding electronic equipment may be generated due to high-density integration. Such heat generated may not only degrade the function of the corresponding device but also cause malfunction of the surrounding devices. Thus, the heat must be controlled. Recently, research on this has been actively in progress. In particular, electrically insulative heat dissipation materials that can dissipate heat are attracting attention as materials usable in LEDs, energy storage systems, and next-generation integrated circuits and thus are being actively developed.

Especially in electric vehicle batteries, the heat generated due to high output, high speed, repeated charging, and the like results in local temperature differences or high heat. As a result, thermal runaway that reduces the efficiency and stability of the battery occurs. This problem occurs due to a lack of heat dissipation and diffusion ability to the outside rather than the heat generated inside a battery.

To solve the problem described above, parts for heat dissipation, such as heat sinks, are installed in electric vehicle batteries. Polyurethane and aluminum are being used widely as materials of heat dissipation parts in the related art. However, polyurethane has poor heat resistance and is thus easily deteriorated when temperature rises rapidly, which is disadvantageous in that a fire spreads. Additionally, aluminum is not used by itself but used as a thermally conductive filler mixed in a polymer resin, making the thermally conductive filler difficult to be uniformly dispersed in the polymer resin. Furthermore, a heat transfer path fails to be formed in a composite material, making thermal conductivity difficult to be improved dramatically.

On the other hand, lithium-ion batteries, having a cell operating voltage of 3.6 V or higher, are used as a power supply for portable electronic devices or attract attention as a power source for eco-friendly vehicles, such as high-output hybrid electric vehicles (HEVs) or pure electric vehicles (EVs), by connecting several cells in series. Such lithium-ion batteries can be manufactured in various forms. A pouch-type battery cell, which has become popular recently, has a flexible case and thus is relatively unrestricted in such forms.

In such a pouch-type battery cell, damage to a separator caused by the expansion of electrode plates in the battery cell causes internal resistance, an increase in voltage level, and a decrease in final battery capacity. Therefore, an interface plate (a member positioned between the battery cells) is needed to cope with the volume expansion of the battery. In the interface plate, a material capable of coping with changes in the volume of the battery cell must have excellent elasticity. However, the situation is that a heat-shielding plate satisfying both formability and heat-shielding performance has yet to be developed.

DOCUMENT OF RELATED ART

Patent Document

Korean Patent Application Publication No. 10-2018-0031968 (Mar. 29, 2018)

SUMMARY OF THE INVENTION

The present disclosure has been developed to solve the problems described above. Specifically, an objective of the present disclosure is to provide a heat-shielding sheet for a battery, the sheet including a functional layer sheet, composed of a flame-retardant layer, a graphite layer, a barrier layer, and the like, in silicone foam used in existing heat-shielding sheets for batteries to solve the disadvantage of polyurethane foam that in the event of a fire, the fire spreads and thermal runaway is accelerated, being lighter than metallic materials, and being capable of rapidly preventing flames and heat from spreading.

The present disclosure relates to a heat-shielding sheet for a battery.

One aspect of the present disclosure relates to a heat-shielding sheet for a battery. The sheet is characterized by including a silicone foam layer and a functional layer laminated on either or both surfaces of the silicone foam layer, the functional layer including one or more layers selected from a flame-retardant layer, a graphite layer, and a barrier layer.

Additionally, the present disclosure is characterized in that the flame-retardant layer may contain flame-retardant silicone and a ceramic filler, and the barrier layer may contain heat-resistant silicone, a fiber filler, and a ceramic filler.

In this case, the fiber filler may include one or more types selected from glass fibers, mineral wool, carbon fibers, aramid fibers, boron fibers, and ceramic fibers. Additionally, the ceramic filler may include one or more types selected from aluminum oxide, aluminum hydroxide, aluminum silicate, fumed silica, wet silica, crushed quartz, titanium oxide, magnesium carbonate, magnesium hydroxide, zinc oxide, iron oxide, diatomite, and carbon black.

Additionally, the graphite layer may contain a graphite sheet and a polymer resin. The functional layer may be formed by laminating the flame-retardant layer, the graphite layer, the flame-retardant layer, and the barrier layer in such an order on either or both the surfaces of the silicone foam layer. One or more layers selected from the silicone foam layer, the flame-retardant layer, the graphite layer, and the barrier layer may further contain a heat-resistant additive.

Additionally, the heat-shielding sheet may have a thickness of 1 to 10 mm.

A heat-shielding sheet for a battery, according to the present disclosure, includes a functional layer sheet, composed of a flame-retardant layer, a graphite layer, a barrier layer, and the like, in silicone foam. Thus, there are advantages of solving the disadvantage of polyurethane foam, used in existing heat-shielding sheets for batteries, that in the event of a fire, the fire spreads and thermal runaway is accelerated, being lighter than metallic materials, and being capable of rapidly preventing flames and heat from spreading.

DESCRIPTION OF THE PREFERRED EMBODIMENTS

Figure 1A:
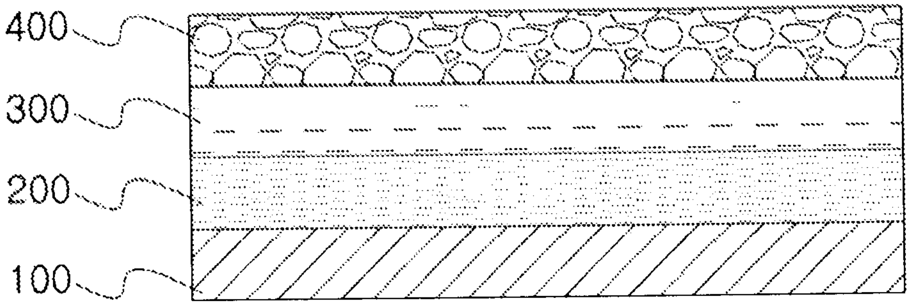
FIGS. 1A to 2C illustrate cross-sectional views of a laminated form of a silicone foam layer and a functional layer, constituting a heat-shielding sheet for a battery, according to one embodiment of the present disclosure.

Hereinafter, a heat-shielding sheet for a battery, according to the present disclosure, is to be described in more detail with reference to drawings and specific embodiments. However, the following embodiments or examples are only a reference for explaining the present disclosure in detail. The present disclosure is not limited thereto and may be implemented in various forms.

In addition, unless otherwise defined, all technical and scientific terms have the same meaning as commonly understood by those skilled in the art to which the present disclosure belongs. The terminology used herein is for the purpose of effectively describing particular embodiments only and is not intended to limit the present disclosure.

Additionally, the following drawings are provided as examples to fully convey the idea of the present disclosure to those skilled in the art. Accordingly, the present disclosure is not limited to the following drawings and may be embodied in other forms. In addition, the following drawings may be exaggerated to clarify the spirit of the present disclosure. Additionally, like reference numerals are used to identify like elements throughout different drawings.

Additionally, unless the context clearly dictates otherwise, the singular forms, such as "a", "an", and "the", used in the specification and the appended claims are intended to include the plural forms.

A fire caused by battery overheating is a problem in currently available electric vehicles. Particularly in the event of a fire caused by internal issues in the mainly used lithium-ion batteries, there is a disadvantage in that water-based fire extinction is difficult due to the high reactivity of lithium ions. For this reason, the inventors of the present disclosure conducted extensive research to solve the problem of having to wait for an electrode itself to burn out. During this research, the use of silicone foam, rather than a commonly used polyurethane foam, was found to inhibit the transfer of flames when ignited. Furthermore, it was found that in the case of additionally laminating a functional layer, including a flame-retardant layer, a graphite layer, and a barrier layer, combustion-induced heat transfer, as well as the transfer of flame, was completely blocked, and the resulting secondary ignition was prevented while the flexibility of a sheet was improved at the same time, thereby completing the present disclosure.

A heat-shield sheet for a battery, according to the present disclosure, is characterized by including a silicone foam layer 100 and a function layer laminated on either or both surfaces of the silicone foam layer 100, the functional layer including one or more layers selected from a flame-retardant layer 200, a graphite layer 300, and a barrier layer 400, as illustrated in FIGS. 1A to 2C.

In the present disclosure, the silicone foam layer is based on a highly heat-resistant silicon component and has a foam-like structure to minimize heat resistance through low density. Additionally, the silicone foam layer may keep thermal energy from being transferred to the surroundings to prevent secondary ignition resulting from thermal runaway.

The silicone foam layer may be based on an organopolysiloxane and formed through curing and foaming by further containing a catalyst and a foaming agent. Additionally, a silane coupling agent may be further contained, as needed, to increase the molecular weight of a siloxane and to further strengthen the mechanical properties. In particular, depending on a functional group, the mechanical properties and heat resistance of the organopolysiloxane may be further improved with the occurrence of both hydrosilylation (alkenyl) and a reaction producing hydrogen gas (reaction between a hydroxyl group and siloxane).

The organopolysiloxane may have a structure represented by Formula 1 below.

$$R_aSiO_{(4-a)/2} \quad \text{[Formula 1]}$$

(In Formula 1, R is an independently selected substituted or unsubstituted hydrocarbyl group, hydroxy group, or alkenyl group, where two or more of R in each molecule are saturated or unsaturated aliphatic groups, and $0<a\leq 3.5$.)

Additionally, each R may independently be straight-chain or branched-chain alicyclic, aromatic, or in a combined form thereof. A cyclic hydrocarbyl group may contain a saturated or non-conjugated alicyclic group and an aromatic group. Additionally, the aromatic group may be monocyclic or polycyclic. In this case, the straight-chain and branched-chain hydrocarbyl groups may be each independently saturated or unsaturated. One example of the combined form of the straight-chain and cyclic hydrocarbyl groups includes an aralkyl group.

In addition, when R is the alkenyl group, an alkenyl group having 2 to 12 carbon atoms is contained, which may be straight-chain or branched-chain. Specifically, examples of the alkenyl group include vinyl, 2-propenyl, 3-butenyl, 5-hexenyl, 7-octenyl, and 10-undecenyl.

The viscosity of the organopolysiloxane is not limited. However, the organopolysiloxane may have a viscosity of 10 to 500,000 Pas, which is more preferably in the range of 20 to 200,000 Pas, at a temperature of 25° C. Nevertheless, polymers having a higher or lower viscosity that does not fall within the above numerical range may also be used.

The coupling agent, added to further improve mechanical properties by being bound and polymerizing the functional group of the organopolysiloxane, may include a silane compound having a vinyl group.

Known silane compounds may be used as the silane coupling agent, and examples thereof include vinyltrimethoxysilane, vinyltriethoxysilane, trialkoxysilanes, tetraethyl orthosilicate, and the like. More preferably, vinyltriethoxysilane and vinyltrimethoxysilane having a vinyl group may be used.

The silane coupling agent may be added in an amount of 0.1 to 10 parts by weight with respect to 100 parts by weight of the organopolysiloxane. When the amount of the coupling agent is less than the above numerical range, polymerization may not occur properly, leading to poor mechanical properties. On the contrary, when the amount of the coupling agent exceeds the above numerical range, the molecular weight may be excessively large, leading to poor formability and foamability.

The catalyst, added to polymerize and cure the siloxane and silane, is not limited in type as long as such a catalyst is commonly used in the art. For example, the catalyst may be a catalyst containing a platinum group metal and more preferably is a hydrosilylation catalyst containing a platinum group metal. The term "platinum group metal" means ruthenium, rhodium, palladium, osmium, iridium, platinum, and any complexes thereof. Non-limiting examples of the catalyst useful herein include those described in U.S. Pat. Nos. 3,159,601, 3,220,972, 3,296,291, 3,419,593, 3,516,946, 3,715,334, 3,814,730, 3,923,705, 3,928,629, 3,989,668, 5,036,117, 5,175,325, and 6,605,734.

Specifically, the catalyst may be a platinum metal, a platinum metal deposited on a carrier such as silica gel or charcoal powder, or a compound or complex of a platinum group metal. Examples thereof include a platinum-containing catalyst obtained by a method involving a reaction between chloroplatinic acid with an aliphatic unsaturated organosilicon compound, such as divinyltetramethyldisiloxane or alkene-platinum-silyl complex, and/or chloroplatinic acid n anhydrous or hexahydrate form. Examples of such a catalyst may include a 1,5-cyclooctadiene-platinum-silyl complex or platinum divinyltetramethyldisiloxane complex. The catalyst may induce curing of the silicone foam layer while stabilizing the foam structure of the cell, thus being preferable.

The amount of the catalyst added to the composition is not limited. However, the catalyst may be added in an amount of 0.01 to 1,000 ppm. When the amount of the catalyst added is less than the above numerical range, polymerization of siloxane may not occur properly. On the contrary, when the amount of the catalyst added exceeds the above numerical range, the formability and foamability of the composition may be poor.

The foaming agent, added to induce foaming of the silicone foam layer to reduce density and increase volume, may include both physical and chemical foaming agents depending on the mode of action.

For example, the chemical foaming agent may be water and alcohol containing one or more hydroxy groups, where the hydroxy groups may react with the Si—H group of the siloxane described above to generate hydrogen gas, which is useful in reducing the density of the foaming agent.

Specifically, when mixed with a silicone resin containing the Si—H group and a foaming agent containing a hydroxy group (—OH), condensation between these components occurs, and the foaming agent releases hydrogen gas. Such released hydrogen gas fails to escape immediately from the silicone foam layer and forms a space, leading to foaming.

Examples of such a chemical foaming agent may include water and organic alcohols having 1 to 12 carbon atoms, especially low-molecular-weight alcohols, such as methanol, ethanol, propanol, isopropanol, and benzyl alcohol, and diols, such as methylene glycol, ethylene glycol, diethylene glycol, and propylene glycol.

The physical foaming agent, the main source of gas leading to the formation of foam, is subjected to a phase change from liquid to gas state while being exposed to a predetermined temperature. Therefore, the density or volume of the final foam may be controlled depending on the amount added.

Examples of such a physical foaming agent may include air, nitrogen, or carbon dioxide in a gaseous form, or hydrocarbons in a liquid form, for example, pentane and hexane, halogenated, more particularly chlorinated and/or fluorinated, hydrocarbons, for example, methylene chloride, chloroform, trichloroethane, hydrofluorocarbons (HFCs), chlorofluorocarbons, and hydrochlorofluorocarbons (HCFCs), ethers, and esters, for example, methyl formate, ethyl formate, methyl acetate, or ethyl acetate, and 1,1,1,3,3-pentafluoropropane.

More preferably, the physical foaming agent includes hydrofluorocarbons. "Hydrofluorocarbon" and "HFC" are interchangeable terms that refer to organic compounds containing hydrogen, carbon, and fluorine. The compound is substantially free of halogens other than fluorine.

Suitable examples of the HFC may not only include aliphatic compounds, such as 1,1,1,3,3-pentafluoropropane (HFC-245fa), 1,1,1,3,3-pentafluorobutane (HFC-365mfc), 1-perfluorobutane, nonafluorocyclopentane, perfluoro-2-methylbutane, 1-fluorohexane, perfluoro-2,3-dimethylbutane, perfluoro-1,2-dimethylcyclobutane, perfluorohexane, perfluoroisohexane, perfluorocyclohexane, perfluoroheptane, perfluoroethylcyclohexane, perfluoro-1,3-dimethylcyclohexane, and perfluorooctane, but also include aromatic compounds, such as, fluorobenzene, 1,2-difluorobenzene, 1,4-difluorobenzene, 1,3-difluorobenzene, 1,3,5-trifluorobenzene, 1,2,4,5-tetrafluorobenzene, 1,2,3,5-tetrafluorobenzene, 1,2,3,4-tetrafluorobenzene, pentafluorobenzene, hexafluorobenzene, and 1-fluoro-3-(trifluoromethyl)benzene.

The amount of the foaming agent added is not limited. However, the foaming agent may be contained in an amount of 0.001 to 30 parts by weight with respect to 100 parts by weight of the organopolysiloxane. When the amount of the foaming agent added is less than the above numerical range, the silicone foam layer may not foam properly. On the contrary, when the amount of the foaming agent added exceeds the above numerical range, the mechanical properties of the silicone foam layer may be significantly poor.

The thickness of the silicone foam layer is not limited. However, the silicone foam layer may have a thickness of 0.5 to 9 mm. When the thickness of the foam layer does not fall within the above numerical range, the heat-shielding effect may be reduced, or the mechanical properties of the sheet may be poor. Therefore, the silicone foam layer preferably has a thickness that satisfies the above numerical range.

In the present disclosure, the graphite layer, provided to solve the disadvantages of the silicone foam layer as described above, has excellent heat dissipation effect and flexibility. Additionally, the graphite layer is lighter than a metallic material-containing interface plate for heat dissipation and thus is characterized by having excellent thermal conductivity and processability.

The graphite layer may fundamentally include a graphite sheet in a flake form and a polymer resin for fixing the graphite sheet and making the same less brittle. However, the polymer resin is preferably contained as a heat-resistant resin to prevent heat-induced denaturation.

Typically, graphite has carbon connected in a hexagonal form like a benzene ring, which forms a plate-like structure in a continuous layer. Therefore, each layer is not physically connected but is spaced apart at predetermined intervals, and an insulation layer filled with air is formed in such kinds of voids. For this reason, thermal conductivity is high in a direction parallel to the carbon layer but is extremely low in a direction perpendicular to the carbon layer.

Such characteristics of graphite allow heat received from a heat source to be conducted extremely fast throughout the graphite layer, thereby preventing the temperature from rising rapidly in local areas. Additionally, the heat transferred from one side to the other may be shielded, thereby preventing the temperature of other layers from rising.

The graphite sheet is light and flexible while having a high thermal conductivity. Such characteristics enable a lightweight heat-shielding sheet having excellent heat dissipation characteristics to be obtained.

The graphite sheet is not particularly limited as long as it is a sheet made of natural or artificial graphite. For example, the graphite sheet may be manufactured by a method described in Japanese Patent Publication No. 61-275117 and Japanese Patent Publication No. 11-21117. Alternatively, a currently available product may be used.

Examples of the currently available product may include an artificial graphite sheet manufactured from a synthetic resin sheet, such as eGRAF SPREADERSHIELD SS-1500 (manufactured by GrafTECH International), Graphinithi (manufactured by Kaneka Co., Ltd.), and PGS graphite sheet (manufactured by Panasonic Co., Ltd.), and a natural graphite sheet manufactured from natural graphite such as eGRAF SPREADERSHIELD SS-500 (manufactured by GrafTECH International).

The graphite sheet preferably has a thermal conductivity of 250 to 2,000 W/m·K, which is more preferably in the range of 500 to 2,000 W/m·K, in a direction approximately perpendicular to a lamination direction of the laminated product. When the thermal conductivity of the graphite sheet falls within the above numerical range, a heat-shielding sheet with excellent heat dissipation and heat-evenness may be obtained.

In the present disclosure, the base resin is added to maintain the graphite in a sheet form while making it less brittle to enhance mechanical properties. Thus, a heat-resistant resin is preferably used to prevent the destruction of the molecular structure, which may occur due to high heat.

Typically, when reaching a predetermined temperature as described above, graphite expands so that thermal conduction is further effectively prevented by generating water and widening the gap between layers. However, when expanding at high temperatures, such graphite becomes more brittle due to the properties of materials, thereby reducing hardness and being easily broken. Additionally, the heat-shielding effect may not last a long time, which is disadvantageous.

Therefore, to control such a disadvantage of graphite, graphite may be coated with a resin having excellent heat resistance and adhesive strength, or graphite may be dispersed in the resin, thereby solving the problem described above.

Examples of such a heat-resistant resin may include a polytetrafluoroethylene, a polyimide, a polyamide-imide, a polysulfone, a polyphenylene sulfide, a polyetheretherketone, a polyetherketone, a polyarylate, and the like. Of all these examples, a polyamide is preferably used.

Such a polyimide, a polymeric material having an imide ring, is polymerized mainly using aromatic anhydrides and aromatic diamines as monomers. Thus, the polyimide has high chemical stability, is highly heat-resistant under various conditions, and is enabled to maintain excellent mechanical properties even in a wide range of temperatures.

A method of preparing the polyimide is not limited. As described above, the polyimide is preferably prepared by polymerizing an aromatic anhydride, especially an aromatic diamine monomer, such as polyamic acid, phenylenediamine, and methylenedianiline, in a solvent. In this case, the polymerization conditions and amount of the anhydride added are preferably controlled according to the molecular weight and viscosity of the polyimide to be prepared. However, the present disclosure is not limited thereto.

The composition ratio of the graphite layer is not limited. However, the heat-resistant resin is preferably contained in an amount of 0.001 to 100 parts by weight with respect to 100 parts by weight of the graphite. Within the above numerical range, the sheet form may be completely obtained while keeping the brittleness of graphite from developing.

Additionally, like the silicone foam layer, the graphite layer may further contain a foaming agent, as needed. The foaming agent may be the same as or different from that in the silicone foam layer. In particular, an appropriate amount of a sublimable inorganic filler, such as barium sulfate or calcium carbonate being sublimable by heat applied when manufacturing the graphite sheet, is preferably added.

The thickness of the graphite layer is not limited. However, like the inner layer, the graphite layer may have a thickness of 1 to 500 μm, which is more preferably in the range of 75 to 200 μm. Within the above numerical range, thermal deformation of the silicone foam layer described above may be prevented while improving the dimensional stability of the sheet.

In the present disclosure, the flame-retardant layer, used to prevent ignition and loss caused by thermal runaway when the heat-shielding sheet is heated and to prevent dimensional deformation, may contain flame-retardant silicone, a fiber filler, and graphite. In this case, the flame-retardant layer may be formed by additionally containing a ceramic filler to further improve heat resistance and mechanical properties, as needed.

The flame-retardant silicone, a silicon-containing polymer that typically exhibits flame retardancy at the V-0 level of UL-94, fundamentally has a structure represented by Formula 2 and may have a form of a composition, including a compound containing an azo group, a metallic compound, and the like.

$$R^1_m SiO_{(4-m)/2} \quad \text{[Formula 2]}$$

(In Formula 2, $R^1$ is a hydroxyl group or a substituted or unsubstituted monovalent hydrocarbon group, and m is a positive number in a range of 1.98 to 2.02.)

In Formula 2, examples of the substituted or unsubstituted monovalent hydrocarbon group may include: an alkyl group, such as a methyl group, an ethyl group, a propyl group, and a butyl group; an alkenyl group, such as a vinyl group, an aryl group, and a butene group; an aryl group, such as a phenyl group and a tolyl group; or a chloromethyl group, a chloropropyl group, a 3,3,3-trifluoropropyl group, a 2-cyanoethyl group, and the like where a part or all of the hydrogen atoms bonded to the carbon atoms of such groups are replaced with halogen atoms, cyano groups, and the like. These may be the same or different from each other.

The azo-based compound, added to further improve the flame retardancy of silicone, may include 2,2'-azobis(2-methylbutyronitrile).

Such 2,2'-azobis(2-methylbutyronitrile) is a compound that greatly improves flame retardancy, especially when used in combination with a metallic compound. Although 2,2'-azobisisobutyronitrile, the only practically available azo-based compound, is decomposed during vulcanization forming to mainly become tetramethylsuccinic acid dinitrile, the LD50 toxicity thereof (tested by oral administration to mice) is 38.9 while the LD50 of diethyldimethylsuccinic acid dinitrile, a decomposition product of 2,2'-azobis(2-methylbutyronitrile), is 1,316. As a result, the difference in LD50 is in two digits, showing that the toxicity is significantly low.

The amount of the azo compound added is not limited. However, a molar ratio between the azo group and the metal is preferably in a range of 1 to 200. When the mixing amount is excessively small, the desired flame retardancy may fail to be obtained. On the contrary, when the mixing amount is excessively large, the desired flame retardancy may fail to be obtainable. Additionally, foaming problems may occur during the forming.

The metallic compound may significantly improve the flame retardancy when mixed with the azo-based compound described above. Specifically, a platinum or cerium-based compound is preferably included, and other metallic compounds may be further included.

Examples of the platinum compound may include platinum, a platinum compound, a platinum complex, chloroplatinic acid, an alcoholic compound of chloroplatinic acid, an aldehyde compound, an ether compound, and a complex compound with all types of olefins.

Additionally, examples of the cerium-based compound may include cerium, an inorganic compound such as cerium oxide and cerium carbonate, and an organic compound such as cerium acetate, cerium octylate, and cerium atom-containing heterosiloxane.

In addition, a mixture of titanium, aluminum, and a rare-earth element is preferably provided as one example of other metallic compounds. Such a metallic compound is preferably contained in an amount of 10 to 100,000 ppm based on the silicone compound.

The fiber filler, a component serving as a sheet to fundamentally form the flame-retardant layer, contains a number of inorganic components, enabling the flame retardancy and incombustibility of the flame-retardant layer to be further improved.

Such a fiber filler may include one or two or more selected from the group consisting of glass fibers, mineral wool, carbon fibers, aramid fibers, boron fibers, and ceramic fibers. Preferably, glass fibers are included.

It is typically known that the thinner the fiber diameter, the more the strength of the glass fibers. Therefore, the glass fibers are characterized by being suitable for the heat-shielding sheet that is required to be lightweight while increasing strength compared to other fiber fillers.

The composition ratio of the glass fibers is not limited. However, the composition ratio of silicon dioxide and the like is preferably limited to broaden a range of operating temperatures by lowering the melting temperature while maintaining elasticity.

Specifically, the glass fiber preferably contains $SiO_2$ in an amount of 57.0 to 63.0 mass %, $Al_2O_3$ in an amount of 19.0 to 23.0 mass %, MgO in an amount of 10.0 to 15.0 mass %, and CaO in an amount of 5.5 to 11.0 mass %, with respect to the total amount, where a content ratio of MgO to CaO (MgO/CaO) is in a range of 0.8 to 2.0.

In particular, when the amount of $SiO_2$ contained is less than the above numerical range, sufficient strength on the fibers may fail to be obtained. On the contrary, when the amount of $SiO_2$ contained exceeds the above numerical range, the 1,0000 poise temperature and liquidus temperature of the molten glass may rise. Additionally, when the amount of $Al_2O_3$ contained is less than the above numerical range, sufficient elastic modulus may fail to be obtained. On the contrary, when the amount of $Al_2O_3$ added exceeds the above numerical range, the melting point of the composition may rise. Furthermore, when the amount of $Al_2O_3$ contained satisfies the above numerical range, the initial crystalline phase of the molten glass during devitrification may be a single crystal of cordierite or a mixed crystal of cordierite and anorthite.

The fiber filler is preferably in a sheet form such as non-woven fabric. The basis weight of the fiber filler is not limited. However, the fiber filler may have a basis weight in a range of 450 to 800 g/m$^2$. When the basis weight is less than the above numerical range, the fire-resistant performance of the flame-retardant layer at high temperatures may fail to be obtained. On the contrary, when the basis weight exceeds the above numerical range, the improvement in the fire-resistant performance is insignificant compared to the increase in weight, which may be inefficient.

The ceramic filler is added to increase the thermal conductivity and mechanical properties of the flame-retardant layer, such as tensile strength and tear strength. In particular, the flame-retardant layer may be deformed due to heat generated from the battery due to the thermal stability of the flame-retardant silicone resin. Therefore, to solve this problem, a heat-resistant additive having low thermal conductivity is preferably contained.

Types of ceramic filler are fundamentally not limited as long as the filler is commonly used as an inorganic filler in the art to which the present disclosure belongs. For example, one or more inorganic fillers, such as fumed silica, wet silica, crushed quartz, titanium oxide, magnesium carbonate, zinc oxide, iron oxide, diatomite, and carbon black, may be included. Additionally, examples thereof may include salts of metals such as iron, titanium, aluminum, nickel, and copper, oxides thereof, and hydroxides thereof, salts of rare-earth metals such as cerium and lanthanum, oxides thereof, and hydroxides thereof, layered silicates such as organic phosphorus compounds, platinum derivatives, carbon black, calcium silicate, aluminum silicate, potassium silicate, and mica, and the like. Of all these, iron oxide, aluminum hydroxide, titanium oxide, aluminum oxide, and the like are preferably included.

Additionally, to increase miscibility with other components, the ceramic filler is preferably subjected to surface treatment with an organic silicon compound, for example, a component such as a silazane compound, thereby improving hydrophobicity. Such surface treatment is preferably performed by immersing the ceramic filler in a composition where the silazane compound and the silane coupling agent are mixed and then leaving the resulting product to stand for a predetermined time to form a film on the surface of the ceramic filler.

Depending on the manufacturing method, the graphite may include natural graphite, including flake graphite, highly crystalline graphite, and microcrystalline graphite, synthetic graphite, including primary graphite, secondary graphite, and graphite fibers, and a graphite intercalation compound such as expandable graphite. In the present disclosure, all the natural graphite, synthetic graphite, and graphite intercalation compound, described above, may be included.

More preferably, the graphite is expandable. Expandable graphite is manufactured by intercalating particles, such as sulfuric acid, nitric acid, and boric acid, between carbon plates and then performing heat treatment at a high temperature of 800 to 1,000° C. in a reducing atmosphere. When reaching a predetermined or higher temperature, expandable graphite expands by generating water from the particles intercalated between the plates and widens the gap between the carbon plates, thereby further effectively shielding heat and oxygen compared to existing graphite.

The amount and particle size of carbon contained in the graphite are not limited. However, the carbon is preferably contained in an amount of 75% or more, which is more preferably in the range of 80% to 100%. Additionally, the particle size, based on the width of the largest side, is preferably 100 μm or more, which is more preferably in the range of 300 to 600 μm. When the amount of carbon contained does not fall within the above numerical range, cracks may occur due to impurities, making the carbon plate more brittle. Additionally, when the size of the carbon particle does not fall within the above numerical range, fire resistance may be poor, making the carbon plate more brittle when heated.

Additionally, the graphite may include carbon fibers. Such carbon fibers are manufactured through processes, such as carbonization and stabilization of a precursor, the raw material, so that the fibers contain only pure carbon elements. The carbon fibers may be included in various forms, such as single fibers, filaments (long fibers), single strands, or fiber bundles. Additionally, the cross-sectional shape or the thickness (fineness) of the fibers is not limited in the present disclosure.

The carbon fibers preferably have a fiber bundle-like form in which a plurality of carbon fiber strands agglomerate. The fiber bundle is present in a form in which the carbon fibers physically agglomerate. Thus, voids similar to those in typical graphite are formed between each fiber strand, thereby maximizing the effect of reducing thermal conductivity.

Additionally, for the same reason as described above, when applying the fiber bundle in a fabric form based on weft and warp, voids may be not only included in the weft or warp but also formed in the fabric itself, thereby further improving the heat-shielding effect while easily maintaining the sheet form, which is more desirable.

The manufacturing method of the carbon fibers is not limited. While carbon fibers are typically manufactured by carbonizing and stabilizing precursor materials, natural or artificial fibers may be used as such precursor materials.

For example, the natural fibers may be one or more types selected from the group consisting of cellulose fibers, protein fibers, and mineral fibers. Examples of the cellulose fibers may include seed fibers, such as cotton or kapok; stem fibers, such as flax, ramie, hemp, or jute, fruit fibers, such as palm fibers, leaf fibers, such as manila, abaca, or sisal, and the like. Additionally, examples of the protein fibers may include wool fibers, silk fibers, hair fibers, and the like. Examples of the mineral fibers may include artificial mineral fibers, such as glass wool and mineral wool, asbestos fiberized by liquefying glass, rock, and other minerals at high temperatures, and the like. Specifically, the natural fibers may include one or more types selected from the group consisting of cellulose such as cotton and rayon-based semi-synthetic fibers manufactured by dissolving the same.

The artificial fibers may be one or more types selected from the group consisting of organic and inorganic fibers. Examples of the organic fibers may include synthetic fibers, such as polyamide-based fibers, polyester-based fibers, polyurethane-based fibers, polyethylene-based fibers, polyvinyl chloride-based fibers, polyfluoroethylene-based fibers, polyvinyl alcohol-based fibers, acrylic fibers, or polypropylene-based fibers. Specifically, the artificial fibers may include one or more types of synthetic fibers selected from the group consisting of nylon, polyester, polyurethane, polyethylene, polyvinyl chloride, polyfluoroethylene, polyvinyl alcohol, acryl, polypropylene, polyacrylonitrile, pitch, and the like. Of all these synthetic fibers, the fibers are preferably based on polyacrylonitrile or pitch as the precursor.

The amount of the graphite added in the present disclosure is not limited. However, the graphite is preferably contained in an amount of 10 to 200 parts by weight with respect to 100 parts by weight of the flame-retardant silicone, a base resin.

The thickness of the flame-retardant layer is not limited. However, the flame-retardant layer preferably has a thickness of 10 to 100 μm. When the flame-retardant layer formed has a thickness smaller than the above numerical range, flame retardancy and flame resistance described above may be difficult to be developed. On the contrary, when the flame-retardant layer formed has a thickness exceeding the above numerical range, the flexibility of the entire sheet may be poor.

In the present disclosure, the barrier layer, fundamentally formed on the outermost layer of the functional layer, serves to protect the flame-retardant layer, the graphite layer, and the silicone foam layer positioned inside from external impacts and the like and to improve mechanical properties, such as impact resistance and flame retardancy, and chemical properties.

Like the flame-retardant layer, the barrier layer may be formed by containing heat-resistant silicone, a fiber filler, a ceramic filler, and the like, and may further contain a component to form a coating layer for protecting the surface, as needed.

The heat-resistant silicone fundamentally contains an organopolysiloxane represented by Formula 3 and having an average degree of polymerization of 100 or more, and may further contain one or more catalysts and additional siloxane compounds.

$$R^2_aSiO_{(4-a)/2} \quad \text{[Formula 3]}$$

(In Formula 3, $R^2$ is a homogeneous or heterologous unsubstituted or substituted monovalent hydrocarbon group where each molecule contains at least two aliphatic unsaturated groups, and a is a positive number in a range of 1.95 and 2.05.)

The organopolysiloxane preferably contains two or more vinyl groups having an average degree of polymerization of 100 or more, where $R^2$ represents the homogeneous or heterologous unsubstituted or substituted monovalent hydrocarbon group. Specific examples thereof include: an alkyl group, such as a methyl group, an ethyl group, and a propyl group; a cycloalkyl group, such as a cyclopentyl group and a cyclohexyl group; an alkenyl group, such as a vinyl group and an allyl group; an aryl group, such as a phenyl group and a tolyl group, or a halogenated hydrocarbon group whose hydrogen atoms are partially substituted with chlorine atoms, fluorine atoms, and the like.

Specifically, the organopolysiloxane is preferably a component whose main chain is composed of a dimethylpolysiloxane unit or a component in which a vinyl group, phenyl group, trifluoropropyl group, and the like are introduced into the main chain of the organopolysiloxane. Additionally, a terminal of the molecular chain may be encapsulated by a triorganosilyl group or a hydroxyl group. Examples of the triorganosilyl group include a trimethylsilyl group, a dimethylvinylsilyl group, a trivinylsilyl group, and the like.

The organopolysiloxane has an average degree of polymerization of 100 or more, which is preferably in the range of 200 to 6,000 and more preferably in the range of 1,000 to 6,000. When the average degree of polymerization is less than 100, the mechanical strength is reduced after curing, thereby being softened.

The catalyst may include a platinum-based catalyst that is typically used as a curing agent for an addition reaction through hydrosilylation. The amount of the catalyst added is not limited. However, the catalyst is preferably contained in an amount of 1 to 2,000 ppm with respect to 100 parts by weight of the organopolysiloxane.

The type of additional siloxane compounds added with the platinum-based catalyst to cure the main component is not limited. However, the siloxane compound is preferably an organopolysiloxane containing hydrogen atoms bonded to at least two silicon atoms in the molecule. The amount of such an organopolysiloxane added is not limited in the present disclosure and may be controlled to fall within a range that does not impair the purpose of the present disclosure without limitation.

The fiber filler and the ceramic filler may be the same or different components from the fiber filler and the ceramic filler contained in the flame-retardant layer described above. Specifically, the fiber filler is preferably glass fibers, and the ceramic filler is preferably titanium dioxide.

The thickness of the barrier layer is not limited. However, the barrier layer preferably has a thickness of 100 to 500 μm. When the barrier layer formed has a thickness smaller than the above numerical range, the desired effect of protecting the flame-retardant layer and the like is insignificant. On the other hand, when the barrier layer formed has a thickness larger than the above numerical range, the overall weight of the sheet increases, and flexibility becomes poor, which is not desirable.

Additionally, the composition to form one or more layers selected from the silicone foam layer, the flame-retardant layer, the graphite layer, and the barrier layer may selectively further contain one or more additives. Examples of such additives may include a surfactant, a solvent, a stabilizer, an adhesion promoter, a colorant including dyes and pigments, an antioxidant, a carrier vehicle, a heat stabilizer, a flame retardant, a thixotropic agent, a flow control additive, an inhibitor, a filler including expanding and reinforcing fillers, a crosslinker, and the like.

In the present disclosure, the methods of each independently manufacturing or laminating the silicone foam layer, flame-retardant layer, graphite layer, and barrier layer are not limited. In one example of forming the respective layers, the compositions to form the respective layers may be prepared by a roll forming method, a blade forming method, and a forming method using a doctor blade and the like. Then, the respective layers may be bonded using an adhesive, including the heat-resistant additive described above.

Preferably, the adhesive is fundamentally a heat-resistant polymer resin, and low heat conductivity may be improved using the heat resistance additive, as described above. Examples of the adhesive may include adhesives based on acryl, epoxy, silicone, urethane, polyamide-imides, and the like. These adhesives may be used alone, or a mixture of two or more adhesives may be used.

Additionally, one or more functional group-rich polymers may be further contained to prevent interlayer delamination that may occur due to heat-induced changes in composition. Examples of such include polymers may perhydropolysilazanes, epoxyalkylalkoxysilanes, aminoalkylalkoxysilanes, isocyanatoalkylalkoxysilanes, mercaptoalkylalkoxysilanes, vinylalkylalkoxysilane, polyhydroxyaminoethers, and the like. Of all these polymers, for the purpose of obtaining heat resistance, perhydropolysilazanes, epoxyalkylalkoxysilanes, or the like are preferably added to increase resistance to delamination through strong bonding with the silicone foam layer, the flame-retardant layer, and the like.

Such a functional group-containing polymer is preferably added in an amount of 1 to 10 parts by weight with respect to 100 parts by weight of the polymer resin constituting the adhesive. When the functional group-containing polymer is added in an amount less than the above numerical range, the effect of preventing delamination is insignificant. On the other hand, when the functional group-containing polymer is added in an amount exceeding the above numerical range, formability and adhesiveness may be poor due to the excessive polymerization or reaction with the adhesive resin.

The heat-shielding sheet for the battery, according to the present disclosure, is not limited in size or shape but preferably has a thickness of 1 to 5 mm. Within the above numerical range, the overall size of the battery may be kept from becoming excessively large while developing sufficient heat-shielding performance.

Figure 1B:
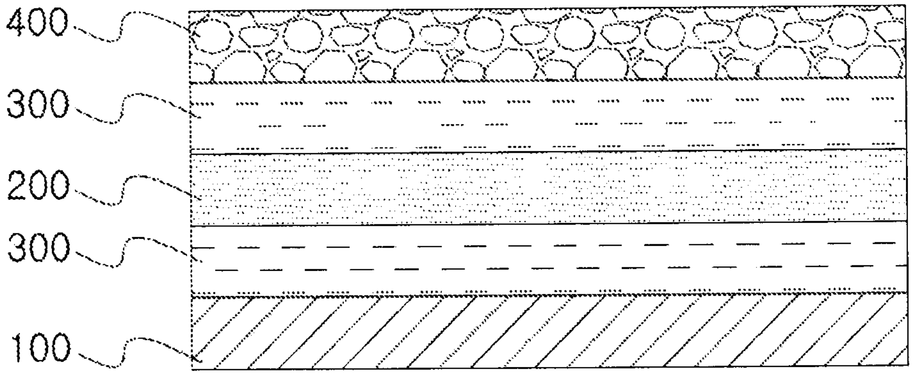
Figure 1C:
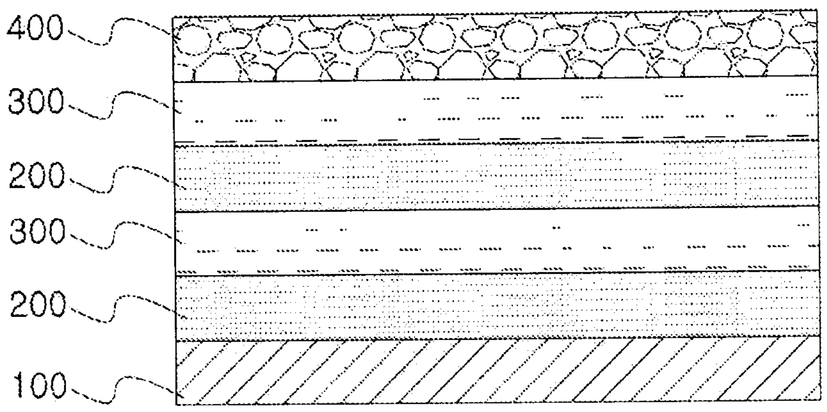

In the heat-shielding sheet for the battery, the lamination order or lamination form of the functional layer is not limited. For example, the flame-retardant layer, the graphite layer, and the barrier layer may be sequentially laminated on either surface of the silicone foam layer, as shown in FIG. 1A, or the graphite layer, the flame-retardant layer, the graphite layer, and the barrier layer may be laminated on either surface of the silicone foam layer, as shown in FIG. 1B, to further strengthen heat resistance. Alternatively, the graphite layer, the flame-retardant layer, the graphite layer, the flame-retardant layer, and the barrier layer may be sequentially laminated on either surface of the silicone foam layer, as shown in FIG. 1C, to obtain both heat resistance and mechanical properties.

Figure 2A:
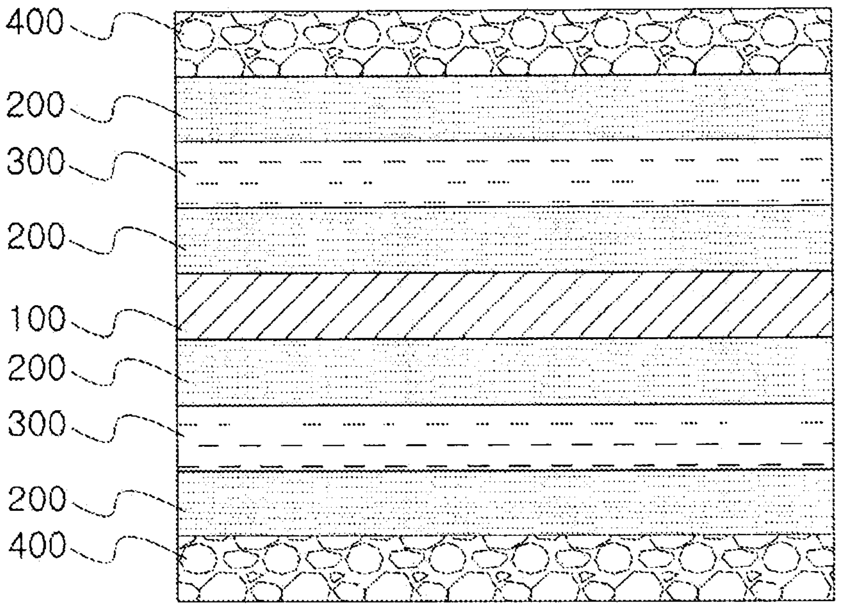
Figure 2B:
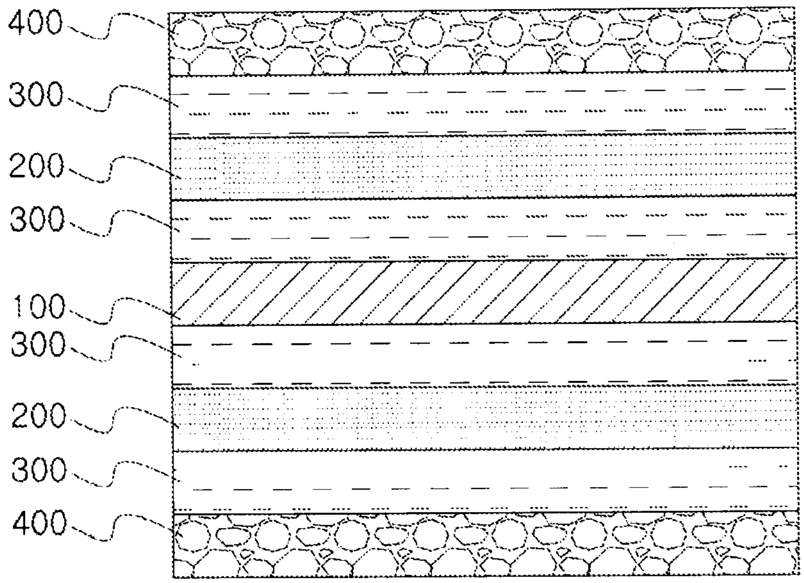
Figure 2C:
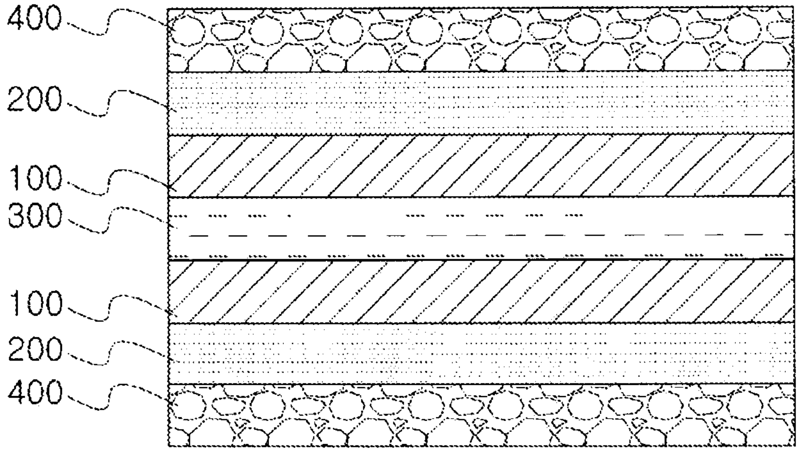

Additionally, FIGS. 2A to 2C illustrate cases of forming a functional layer on both surfaces of the silicone foam layer. As shown in FIG. 2A, the flame-retardant layer, the graphite layer, the flame-retardant layer, and the barrier layer may be sequentially laminated on both surfaces of the silicone foam layer to obtain mechanical properties and flame retardancy. Alternatively, the graphite layer, the flame-retardant layer, the graphite layer, and the barrier layer may be sequentially laminated on both surfaces of the silicone foam layer, as shown in FIG. 2B, or the silicone foam layer, the flame-retardant layer, and the barrier layer may be sequentially laminated on both surfaces of the graphite layer, as shown in FIG. 2C.

The heat-shielding sheet for the battery, according to the present disclosure, is placed between an external housing and the battery in which a number of battery cells and spacers are stacked, and is provided to cover all the upper, lower, and side surfaces. In this case, the heat-shielding sheet is preferably provided such that the barrier layers are each independently formed on both the exposed surfaces to face the external housing.

The heat-shielding sheet for the battery, according to the present disclosure, includes the silicone foam layer made of the polymer resin and the functional layer, including the flame-retardant layer, the graphite layer, the barrier layer, and the like, in the silicone foam layer. Thus, there are advantages of solving the disadvantage of polyurethane foam, used in existing heat-shielding sheets for batteries, that in the event of a fire, the fire spreads and thermal runaway is accelerated, being lighter than metallic materials, and being capable of rapidly preventing flames and heat from spreading.

Hereinafter, the present disclosure will be described in more detail through examples and comparative examples. However, the following examples are provided only to illustrate the present disclosure in more detail and should not be construed as limiting the present disclosure.

(Heat-Shielding Performance)

① First, a manufactured specimen (160 mm×110 mm×3 mm, Comparative Example 7 had a thickness of 0.5 mm) was placed inside a space wrapped with an insulation material (having a thickness of 50 mm) and thermally shielded completely from the outside. While placing a heater (having a voltage level of 110 V, a current of 5 A, and a power output of 1.2 kW) in the front, the insulation material was positioned between the specimen and the heater. Then, the insulation material and the heater were spaced apart from each other at intervals of 2 mm. Next, the heater operated toward the specimen until the temperature reached 700° C. Afterward, the insulation material in the middle was removed, and the temperature on the back of the specimen was measured after 1, 2, 3, 4, and 5 minutes using a temperature sensor.

Examples 1 and 2 and Comparative Examples 1 to 7

The sheet was manufactured by laminating an inner layer, a silicone foam layer, a graphite layer, and a glass bubble layer. However, the respective layers, formed through examples and comparative examples, were made of the same components. The compositions thereof are listed in Table 1 below. However, the lamination order of each sheet varied for examples and comparative examples as shown in Table 2. All the manufactured specimens had a thickness of 2.66 mm. In this case, regarding the changes in thickness with varying degrees to which each layer was laminated, the total thickness was set to 2.66 mm by controlling the total thickness of the silicone foam layer.

TABLE 1

| | Component | Amount added | Thickness (mm) |
|---|---|---|---|
| Barrier layer | Fiberglass mesh | 10 parts by weight | 0.27 |
| | Aluminum hydroxide | 100 parts by weight | |
| | Aluminum oxide | 1000 parts by weight | |
| | Organopolysiloxane | 100 parts by weight | |
| Silicone foam layer | Organopolysiloxane (100 Pa · S) | 100 parts by weight | Varies with configuration of each layer |
| | Vinyltrimethoxysilane | 5 parts by weight | |
| | Platinum divinyltetramethyldis iloxane complex | 20 ppm | |
| | Aluminum hydroxide | 50 parts by weight | |
| | Aluminum silicate | 60 parts by weight | |
| | Methanol | 10 parts by weight | |
| Graphite layer | Graphite sheet | 100 parts by weight | 0.14 |
| | Polyethylene terephthalate | 10 parts by weight | |
| Flame-retardant layer | Expandable graphite | 100 parts by weight | 0.06 |
| | Organopolysiloxane | 100 parts by weight | |
| Mica | Mica | 100 parts by weight | 0.2 (Comparative Example 2) |
| | Glass fibers | 10 parts by weight | 0.3 (Comparative Example 3) |
| | Ceramic film | 10 parts by weight | |
| Aerogel | Nano-silica | 100 parts by weight | 2.66 |
| | Glass fiber | 10 parts by weight | |

TABLE 2

| | Lamination order | Note |
|---|---|---|
| Example 1 | Barrier layer - flame-retardant layer - graphite layer - flame-retardant layer - silicone foam layer - flame-retardant layer - graphite layer - flame-retardant layer - barrier layer | Silicone Foam 1.6 T |
| Example 2 | Barrier layer - flame-retardant layer - silicone foam layer - graphite layer - silicone foam layer - flame-retardant layer - graphite layer - barrier layer | Silicone foam 0.93 T * 2 ea |
| Comparative Example 1 | Barrier layer - flame-retardant layer - silicone foam layer - flame-retardant layer - barrier layer | Silicone foam layer 1.84 T |
| Comparative Example 2 | Mica layer - flame-retardant layer - graphite layer - flame-retardant layer - silicone foam layer - flame-retardant layer - graphite layer - flame-retardant layer - barrier layer | |
| Comparative Example 3 | Mica layer - flame-retardant layer - graphite layer - flame-retardant layer - silicone foam layer - flame-retardant layer - graphite layer - flame-retardant layer - barrier layer | |

TABLE 2-continued

| | Lamination order | Note |
|---|---|---|
| Comparative Example 4 | Aerogel | |
| Comparative Example 5 | Barrier layer-silicone foam layer-graphite layer-silicone foam layer-barrier layer | Silicone Foam 1.1 T |
| Comparative Example 6 | Graphite layer - flame-retardant layer - silicone foam layer - flame-retardant layer - graphite layer | Silicone Foam 2.26 T |
| Comparative Example 7 | Barrier layer - flame-retardant layer - graphite layer | Not involving silicone foam layer |

TABLE 3

| | Time | Temperature of back after heating (° C.) |
|---|---|---|
| Example 1 | 1 minute | 87 |
| | 2 minutes | 109 |
| | 3 minutes | 128 |
| | 4 minutes | 150 |
| | 5 minutes | 170 |
| Example 2 | 1 minute | 68 |
| | 2 minutes | 100 |
| | 3 minutes | 134 |
| | 4 minutes | 164 |
| | 5 minutes | 189 |
| Comparative Example 1 | 1 minute | 88 |
| | 2 minutes | 161 |
| | 3 minutes | 219 |
| | 4 minutes | 259 |
| | 5 minutes | 288 |
| Comparative Example 2 | 1 minute | 117 |
| | 2 minutes | 171 |
| | 3 minutes | 196 |
| | 4 minutes | 244 |
| | 5 minutes | 295 |
| Comparative Example 3 | 1 minute | 97 |
| | 2 minutes | 151 |
| | 3 minutes | 176 |
| | 4 minutes | 224 |
| | 5 minutes | 275 |
| Comparative Example 4 | 1 minute | 165 |
| | 2 minutes | 228 |
| | 3 minutes | 280 |
| | 4 minutes | 323 |
| | 5 minutes | 362 |
| Comparative Example 5 | 1 minute | 83 |
| | 2 minutes | 144 |
| | 3 minutes | 171 |
| | 4 minutes | 204 |
| | 5 minutes | 235 |
| Comparative Example 6 | 1 minute | 145 |
| | 2 minutes | 209 |
| | 3 minutes | 241 |
| | 4 minutes | 276 |
| | 5 minutes | 300 |
| Comparative Example 7 | 1 minute | 203 |
| | 2 minutes | 305 |
| | 3 minutes | 354 |
| | 4 minutes | 387 |
| | 5 minutes | 495 |

As shown in Table 3 and FIGS. 3 to 6, it is confirmed that the heat-shielding sheet, manufactured according to the present disclosure, has an excellent heat-shielding effect despite being continuously exposed to high-temperature heat while keeping the sheet form intact. In particular, considering that flame retardancy is better in Example 1, including two graphite layers, than in Example 2, including one graphite layer, it is seen that expandable graphite constituting the graphite layer expands by heating and thus forms a number of pores, thereby effectively blocking the heat transfer from the front to the back.

Figure 3A:
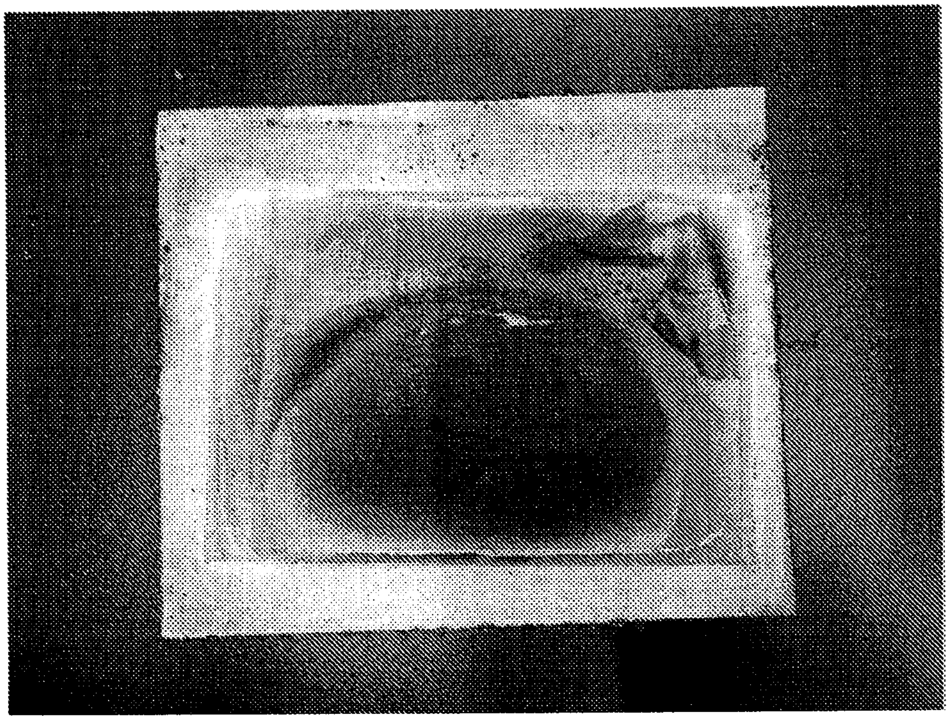
FIG. 3A shows images of the front of a heat-shielding sheet manufactured through Example 1 of the present disclosure, the images obtained after heating the sheet at a temperature of 700° C.
Figure 3B:
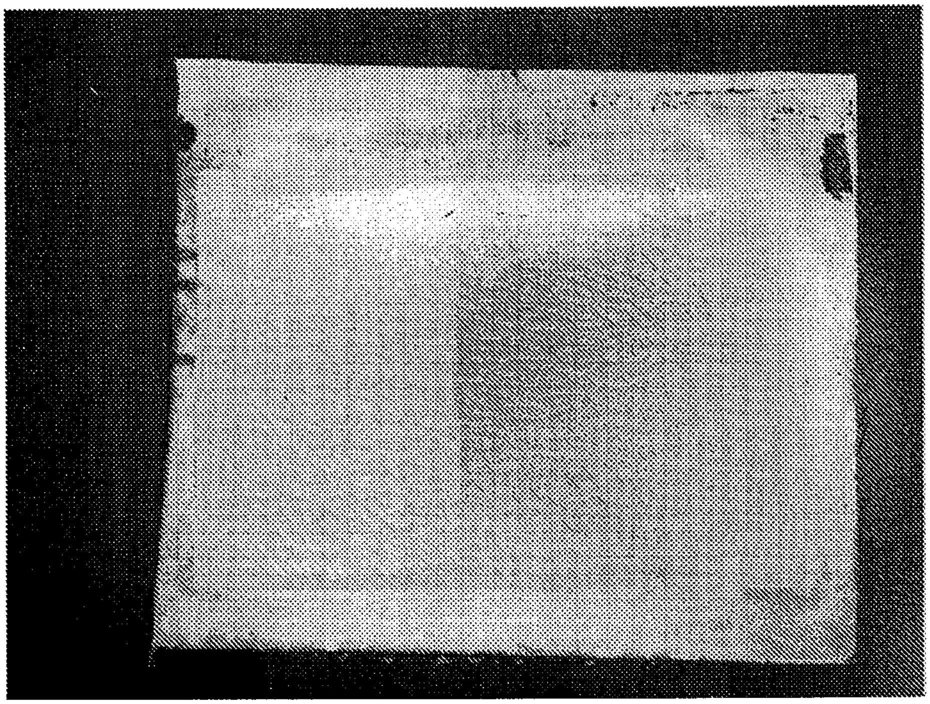
FIG. 3B shows images of the back of a heat-shielding sheet manufactured through Example 1 of the present disclosure, the images obtained after heating the sheet at a temperature of 700° C.

From FIG. 3, showing the exterior of the specimen after heating, it was seen that a significant amount of soot was produced on the front of the specimen of Example 1. However, except for some discoloration, soot was hardly produced on the back, meaning that almost no thermal deformation occurred because heat failed to be transferred properly to the back of the sheet.

On the contrary, it was seen that the temperature on the back rapidly rose 2 minutes after the end of heating in Comparative Example 1, not involving the graphite layer, and the temperature on the back rapidly rose 1 minute after the end of heating in Comparative Example 5, not involving the flame-retardant layer, and Comparative Example 6, not involving the barrier layer. This shows that heat failed to be shielded properly by the expansion of expandable graphite of the graphite layer by heating but was effectively shielded only when both the silicone component and the fiber filler, constituting the flame-retardant layer and the barrier layer, were provided.

In addition, it is seen that in the case of Comparative Example 4, only including aerogel, and Comparative Example 7, having a thickness of 0.5 mm and not involving the silicone foam layer, excessive heat is transferred to the back, making it difficult to function properly as the heat-shielding sheet. Additionally, considering that the heat-shielding efficiency in Comparative Examples 2 and 3, in which the barrier layer is substituted with the mica layer, was reduced compared to that in examples, it is confirmed that all the silicone foam layer, the flame-retardant layer, the graphite layer, and the barrier layer must be included, as in the present disclosure, to obtain the best heat-shielding efficiency.

Figure 4A:
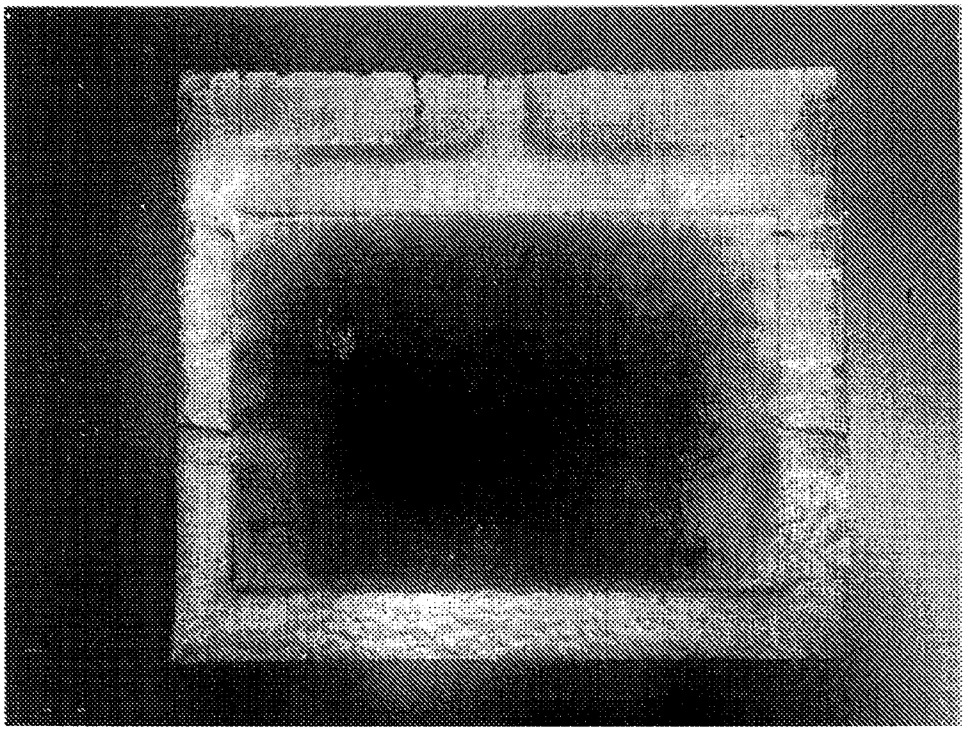
FIG. 4A shows images of the front of a heat-shielding sheet manufactured through Comparative Example 2 of the present disclosure, the images obtained after heating the sheet at a temperature of 700° C.
Figure 4B:
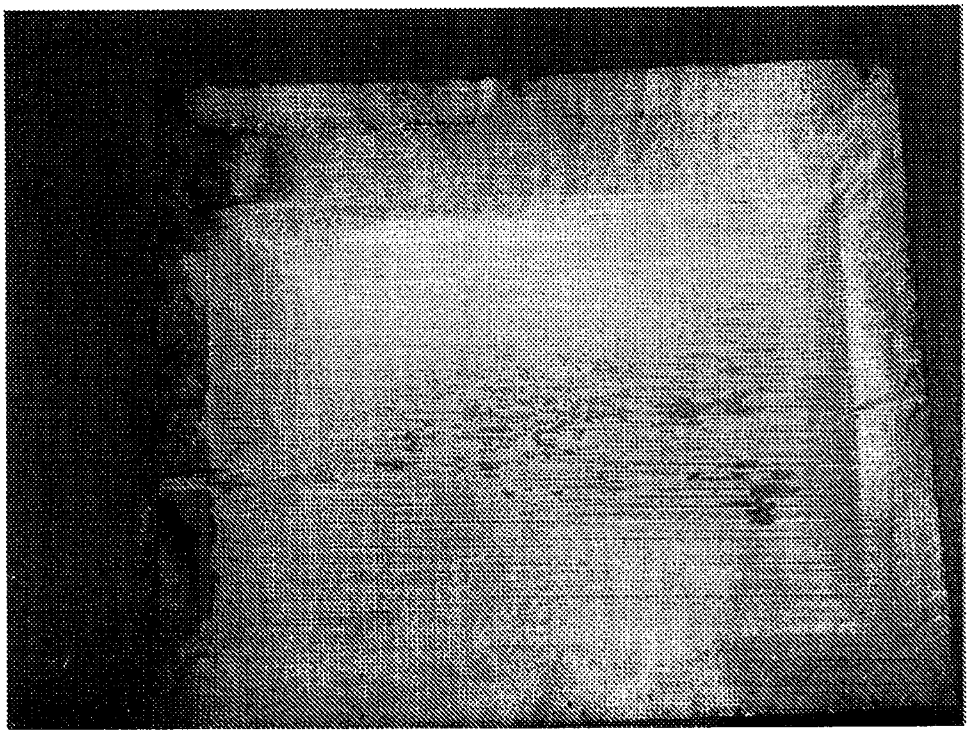
FIG. 4B shows images of the back of a heat-shielding sheet manufactured through Comparative Example 2 of the present disclosure, the images obtained after heating the sheet at a temperature of 700° C.
Figure 5A:
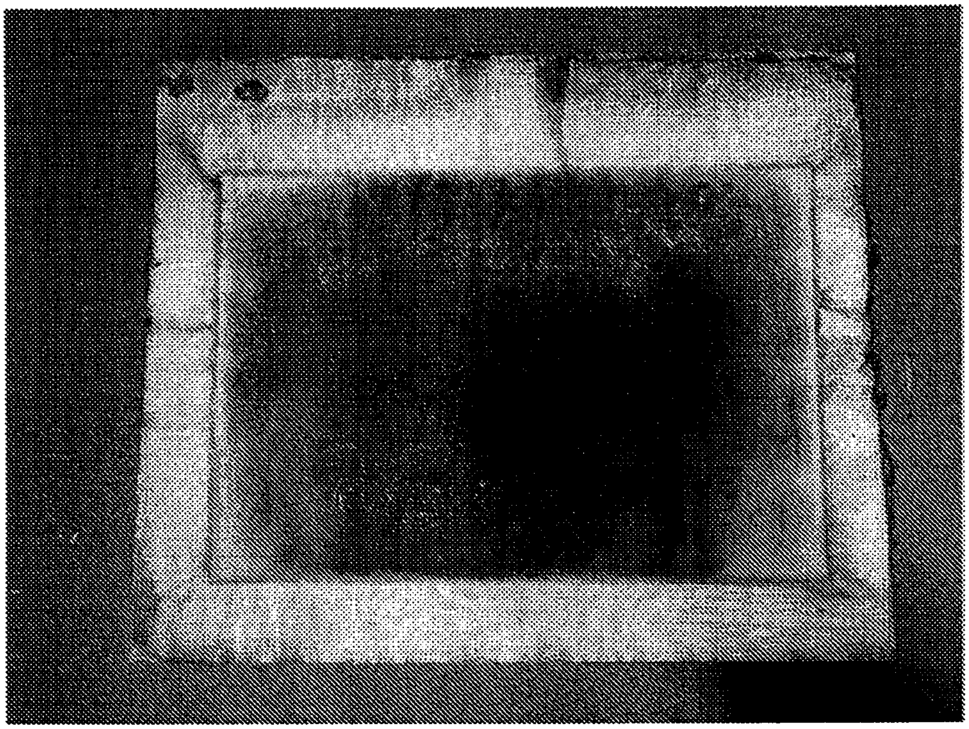
FIG. 5A shows images of the front of a heat-shielding sheet manufactured through Comparative Example 3 of the present disclosure, the images obtained after heating the sheet at a temperature of 700° C.
Figure 5B:
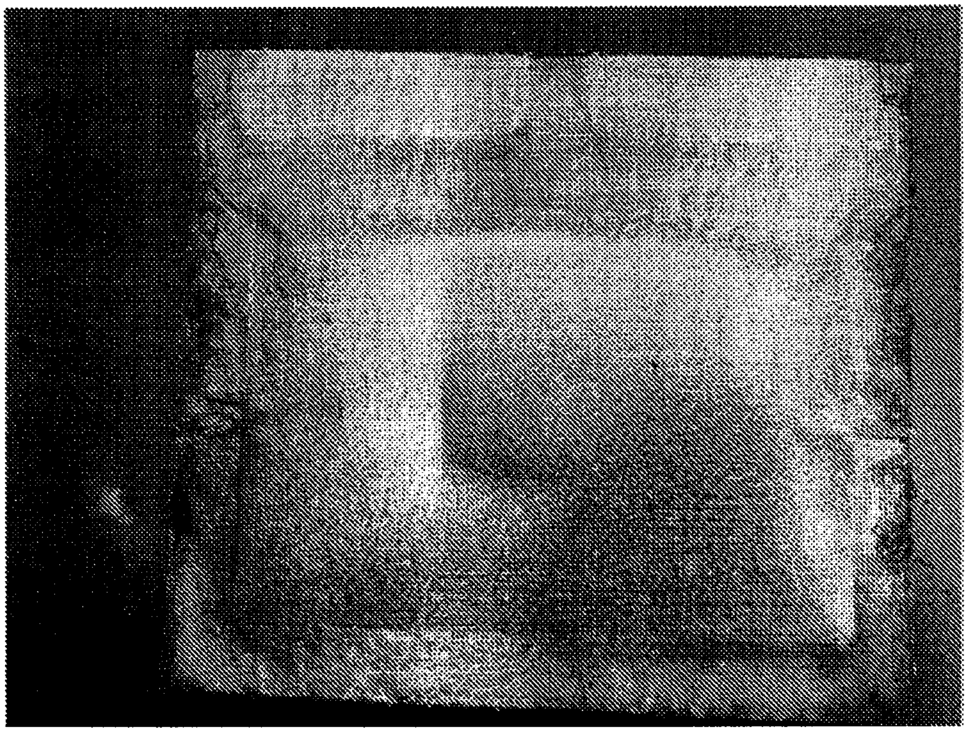
FIG. 5B shows images of the back of a heat-shielding sheet manufactured through Comparative Example 3 of the present disclosure, the images obtained after heating the sheet at a temperature of 700° C.
Figure 6A:
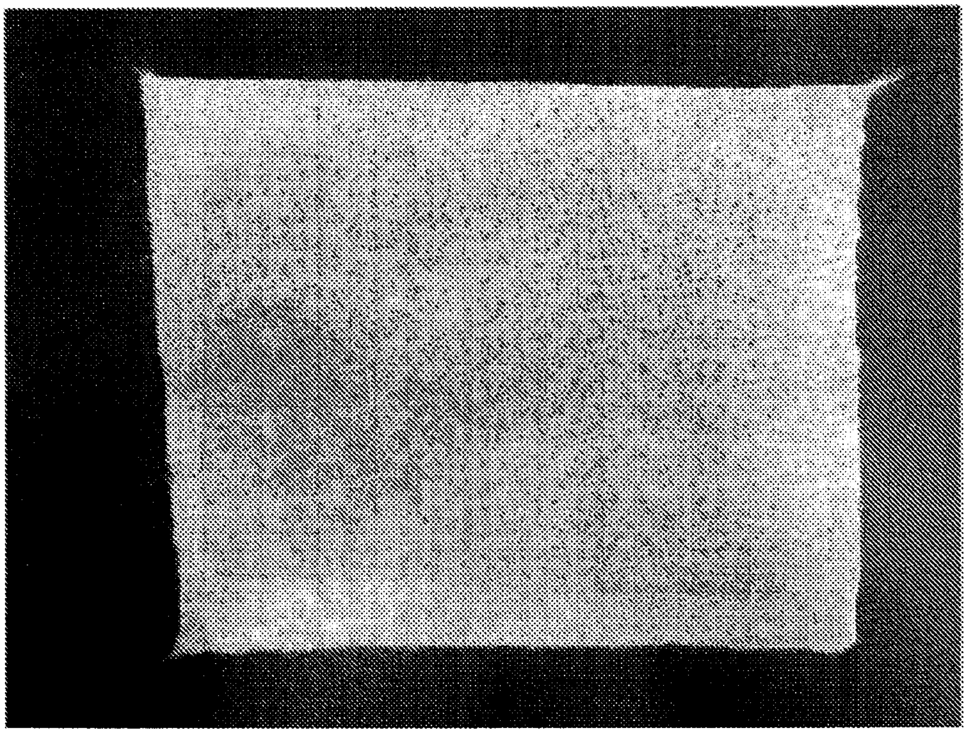
FIG. 6A shows images of the front of a heat-shielding sheet manufactured through Comparative Example 4 of the present disclosure, the images obtained after heating the sheet at a temperature of 700° C.
Figure 6B:
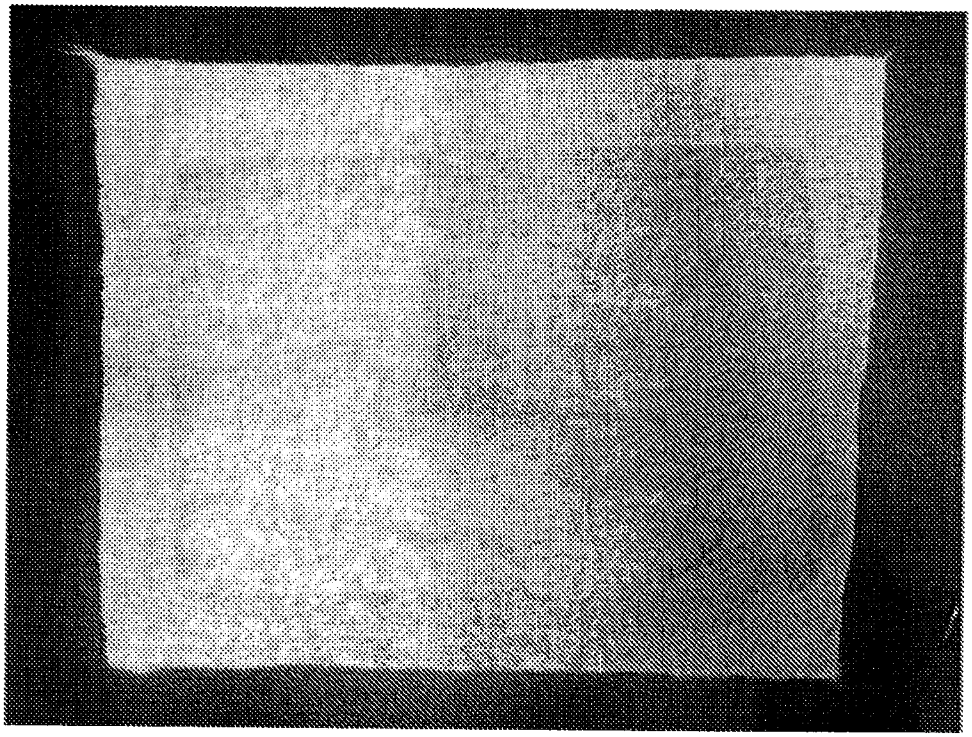
FIG. 6B shows images of the back of a heat-shielding sheet manufactured through Comparative Example 4 of the present disclosure, the images obtained after heating the sheet at a temperature of 700° C.

From FIGS. 4 to 6, showing the front and the back of the specimens taken after performing the heating test on Comparative Examples 2 to 4, intense soot was produced on both the front and back surfaces in Comparative Examples 2 and 3, in which the barrier layer was replaced with the mica layer. This shows that heat was quickly transferred to the back, leading to thermal deformation. In Comparative Example 4, where the sheet was formed only of the aerogel layer, soot was hardly produced on both the front and back surfaces. However, considering that silicon dioxide, the main component, has a melting point of 1,710° C., it is seen that soot and the like are not produced, regardless of heat transfer capability, because the temperature at which thermal deformation occurs is much higher than that of other components. Crucially, it is seen that the specimen of Comparative Example 4 fails to function as a heat-shielding sheet because the temperature of the back is 362° C. 5 minutes after stopping the heating.

Although the preferred embodiment of the present disclosure has been described in detail hereinabove, the scope of the present disclosure is not limited thereto. That is, several modifications and alternatives made by those skilled in the art using a basic concept of the present disclosure as defined in the appended claims fall within the scope of the present disclosure.

What is claimed is:

1. A heat-shielding sheet for a battery, the sheet comprising:

a silicone foam layer having a first surface; and a second surface; and a first functional layer laminated on the first surface of the silicone foam layer and a second functional layer laminated on the second surface of the silicone foam layer, each of the first functional layer and the second functional layer comprising a first flame-retardant layer disposed on the corresponding one of the first surface and the second surface of the silicone foam layer, a graphite layer disposed on the first flame-retardant layer, a second flame-retardant layer disposed on the graphite layer, and a barrier layer disposed on the second flame-retardant layer, wherein each of the first flame-retardant layer and the second flame-retardant layer of each of the first functional layer and the second functional layer comprises a flame-retardant silicone, expandable graphite, and a first fiber filler, wherein the first fiber filler comprises a plurality of glass fibers, the plurality of glass fibers containing, with respect to a total mass of the plurality of glass fibers, $SiO_2$ in an amount of 57.0 to 63.0 mass percent, $Al_2O_3$ in an amount of 19.0 to 23.0 mass percent, MgO in an amount of 10.0 to 15.0 mass percent, and CaO in an amount of 5.5 to 11.0 mass percent, and the plurality of glass fibers having a mass ratio of MgO to CaO in a range of 0.8 to 2.0, wherein the barrier layer of each of the first functional layer and the second functional layer comprises a heat-resistant silicone, a second fiber filler, and a ceramic filler, wherein the heat-resistant silicone comprises an organopolysiloxane having an average degree of polymerization of 100 or more and containing two or more vinyl groups.

2. The sheet of claim 1, wherein the first fiber filler is in a sheet form having a basis weight of 450 to 800 $g/m^2$.

3. The sheet of claim 1, wherein each of the first flame-retardant layer and the second flame-retardant layer of each of the first functional layer and the second functional layer has a thickness of 10 to 100 micrometers.

4. The sheet of claim 1, wherein the ceramic filler of the barrier layer of each of the first functional layer and the second functional layer has a thickness of 100 to 500 micrometers.

5. The sheet of claim 1, wherein the graphite layer of each of the first functional layer and the second functional layer comprises a graphite sheet and a heat-resistant resin selected from the group consisting of polytetrafluoroethylene, a polyimide, a polyamide-imide, a polysulfone, a polyphenylene sulfide, a polyetheretherketone, a polyetherketone, and a polyarylate.

6. The sheet of claim 1, further comprising an adhesive layer disposed between at least one pair of adjacent layers selected from the group consisting of the silicone foam layer and, the first flame-retardant layer of at least one of the first functional layer and the second functional layer, the first flame-retardant layer and, the graphite layer of at least one of the first functional layer and the second functional layer, the graphite layer and the second flame-retardant layer of at least one of the first functional layer and the second functional layer, and the second flame-retardant layer, and the barrier layer of at least one of the first functional layer and the second functional layer, the adhesive layer comprising a heat-resistant polymer resin and a functional group-containing polymer, the functional group-containing polymer comprising perhydropolysilazane, wherein an amount of the functional group-containing polymer is 1 to 10 parts by weight with respect to 100 parts by weight of the heat-resistant polymer resin.

7. The sheet of claim 1, wherein the sheet has a thickness of 1 to 5 mm.

* * * * *